May 27, 1969

M. N. LEVY 3,447,078

ELECTRICAL PROBE FOR TESTING TRANSISTORS AND THE LIKE
HAVING ROTATABLY SUPPORTED ACTUATOR
FOR PLURAL PROBE TIPS

Filed July 17, 1964

INVENTOR
MURRAY N. LEVY

BY Jacob Trachtman
ATTORNEY

United States Patent Office 3,447,078
Patented May 27, 1969

3,447,078
ELECTRICAL PROBE FOR TESTING TRANSISTORS AND THE LIKE HAVING ROTATABLY SUPPORTED ACTUATOR FOR PLURAL PROBE TIPS
Murray N. Levy, Colmar, Pa., assignor to American Electronic Laboratories, Inc., Colmar, Pa., a corporation of Pennsylvania
Filed July 17, 1964, Ser. No. 383,296
Int. Cl. G01r 31/02; H01r 13/22
U.S. Cl. 324—72.5                      13 Claims

ABSTRACT OF THE DISCLOSURE

A test probe for transistors and the like including a hand held housing and three substantially parallel probe elements extending therefrom for contacting the device under test. A first control means comprising a cam actuator adjusts the lateral distance between the contacting ends of two of the probe elements, and a second control means comprising a rack and gear assembly adjustably extends the contacting end of the third probe element relative to the first two probe elements.

---

Figure 1:
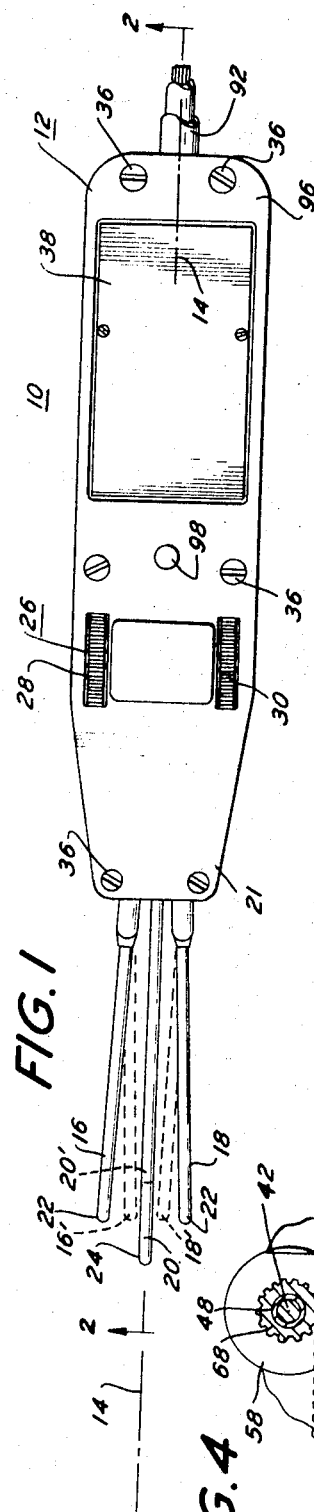

The invention relates to a probe device, and more particularly to a test probe device for providing electrical connection with a circuit or an element such as a transistor having a plurality of terminals.

Heretofore, probe devices have been provided with adjustable contacts for making electrical connection with circuit devices for testing purposes. However, such probing devices have not been easily handled and adjusted, thereby increasing the time and effort required by the operator.

It is, therefore, a principal object of the invention to provide a new and improved probe means having a plurality of elements which are readily and easily adjustable for making contacts at several respective locations.

Another object of the invention is to provide a new and improved probe means having adjustable elements for making concurrent contact with a plurality of linearly or non-linearly arranged locations.

Another object of the invention is to provide a new and improved probe means provided with contact elements which may be moved closer together and further apart to adjust the distance between them.

Another object of the invention is to provide a new and improved probe means particularly adapted for contacting the three terminals of a transistor device and having the contacting elements of the device readily adjustable to conform with the spacing of transistor terminals being contacted.

Another object of the invention is to provide a new and improved probe means which is most easily handled and adjusted by an operator using the thumb or fingers of one hand.

Another object of the invention is to provide a new and improved probe means which is readily and inexpensively manufactured and has a long operating life.

The above objects, as well as many other objects of the invention, are achieved by providing a probe means comprising a handle means and first, second and third conducting elements, each having a contact and extending from said handle means and a second end received within said handle means. The first and second elements are pivotally supported between their respective ends within said handle means.

Control means including cam means, which is rotatably supported by the handle means, engages the second ends of the first and second elements for adjustably fixing the distance between the second ends of said first and second elements and thereby correspondingly adjustably fixing the distance between the contact ends of said first and second elements. The control means includes a gear rack means for extending the contact end of the third element and adjustably fixing its position with respect to the contact ends of said first and second elements.

The control means also includes means biasing the second ends of said first and second elements towards each other, while the cam means is positioned between the second means of the first and second elements. A first actuating wheel connected with the cam means for rotatably positioning the cam means operates to adjustably fix the relative position of the contact ends of the first and second elements with respect to each other.

The rack means of said control means is positionably adjusted by being slidably supported by the handle means and is connected with the second end of said third element for extending its contact end and adjustably fixing the position of its contact end with respect to the contact ends of the first and second elements. The control means also includes a gear wheel or pinion rotatably mounted within said handle means in engagement with the rack means, being rotatable for actuating and adjustably fixing the position of the rack means. A second actuating wheel is connected with the pinion for rotatably positioning the pinion and extending the contact end of said element and adjustably fixing its position with respect to the contact ends of said first and second elements.

The handle means and said elements extend along a longitudinal axis and said first and second elements have pivotal connections with the handle means on opposite sides of the longitudinal axis, while the third element is positioned along said axis between first and second elements. The extending contact end of each of the elements is directed perpendicular to the longitudinal extending direction of its said element.

A cable may be provided having wires respectively electrically connected with the first, second and third wire elements for connection with appropriate apparatus, and additional wires for connection with a manual switch carried by said handle for initiating an operation upon the positioning and connection of said elements with an external device or circuit, or for transmitting control signals to the test apparatus.

Figure 4:
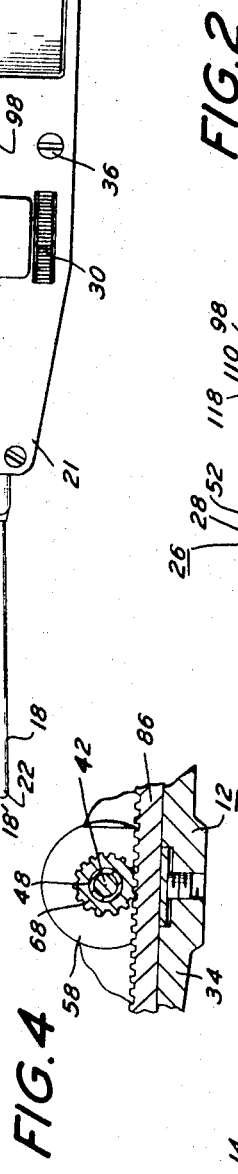
Figure 2:
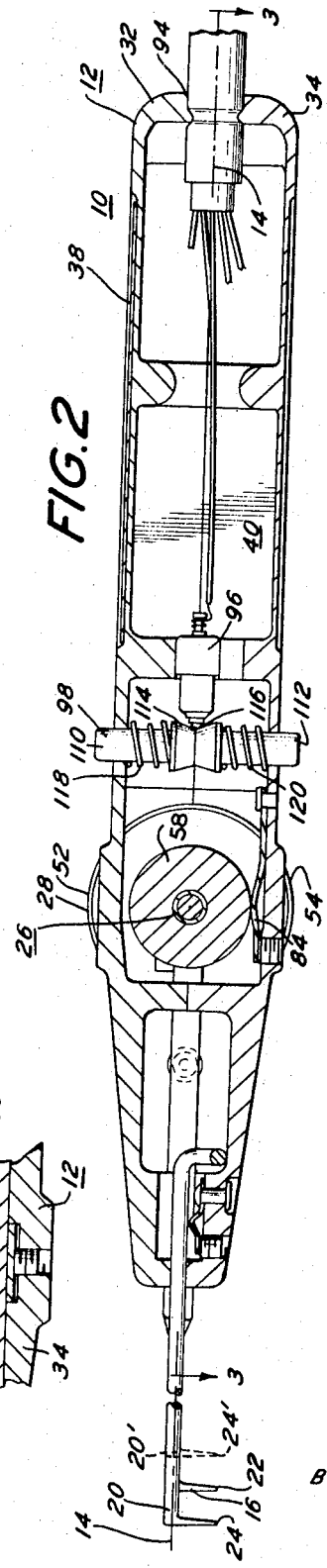
Figure 3:
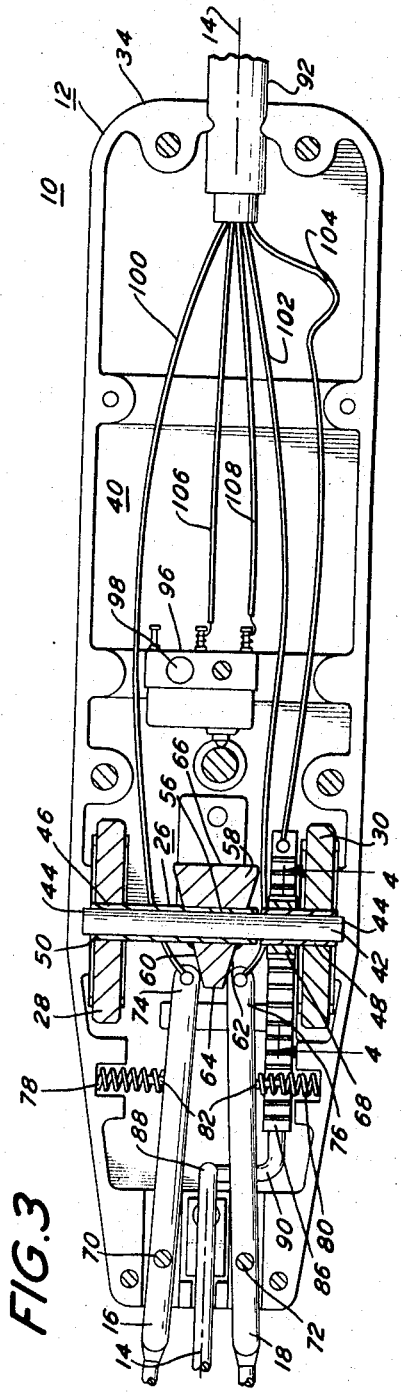

The foregoing and other objects of the invention will become more apparent as the following detailed description of the invention is read in connection with the drawings, in which:

FIGURE 1 is a plan view of the probe means embodying the invention,

FIGURE 2 is a sectional view taken on the line 2—2 of FIGURE 1, with a portion of the conducting elements broken away, FIGURE 3 is a sectional view taken on the line 3—3 of FIGURE 2 with the extending ends of the conducting elements broken away, and FIGURE 4 is a fragmentary view of the control means pinion and rack taken on the line 4—4 of FIGURE 3.

Like reference numerals designate like parts throughout the several views.

Refer to the figures which disclose a test probe means 10 embodying the invention, comprising a handle means 12 made of an insulating material, such as plastic material, which extends along a longitudinal axis 14. First, second and third electrically conducting elements 16, 18 and 20 extend from the front end 21 of the handle means in a direction along the longitudinal axis 14. The contact ends 22 of the elements 16 and 18 and the contact ends 24 of the element 20, extend in a direction perpendicular to the extending longitudinal axis direction of each of its elements. The outer surfaces of the conducting elements 16, 18 and 20 may be provided with an electrical insulating material to prevent short circuiting of the elements, except for their tip portions, such as the contact ends 22 and 24, which are adapted for electrically engaging and making contact with circuits and devices to be tested.

The handle means 12 carries a control means 26 for adjustably fixing and controlling the positions of the contact ends 22, 24 of the conducting elements 16, 18 and 20. The actuating wheel 28 of the means 12, which may be rotated by the thumb or fingers of the operator's hand grasping the handle 12, controls the relative movement in a lateral direction of the contact ends 22 of the elements 16 and 18. The movements of the ends 22 of the elements 16 and 18 are in a lateral direction towards and away from each other, FIGURE 1 showing by dashed lines at 16′ and 18′ the positions of the elements 16 and 18 with their ends 22 proximately located. This position of the elements 16 and 18 allows sufficient clearance for receiving between them and allowing movement of the element 20. The insulating coating on the elements in this arrangement is most useful in preventing their being short circuited by their electrical contact. The actuating wheel 28 is, thus, rotated to adjustably fix the position of the ends 22 of the elements 16, 18 with the required separation between them.

The control means 26 also provides a second actuating wheel 30 which may also similarly be rotated by the thumb or finger of the hand grasping the handle means 12 for positioning the end 24 of the element 20 with respect to the ends 22 of the elements 16 and 18. FIGURE 1 shows by solid lines the element 20 in its extended position, while indicating the retracted position of the element by the dashed lines at 20′. The retracted position is also clearly shown by the dashed contact end 24′ of FIGURE 2. Thus, the element 20 extends and retracts by movement along the longitudinal axis 14 between the elements 16 and 18 which are positioned on each side thereof. Of course, intermediate positions between extremes shown in FIGURES 1 and 2 may be assumed by the contact ends 22, 24 of the elements 16, 18 and 20, so that the contact ends are positionable in many linearly or non-linearly arrangements. The ends, thus, may be relatively positioned to make simultaneous contacts with the terminals of a transistor or other such devices or circuits which are to be electrically contacted for testing or other purposes.

Referring now particularly to FIGURES 2, 3 and 4 for a more detailed description of the probe means 10, the handle means 12 is comprised of upper and lower sections 32 and 34 which are secured together by the screw means 36 shown in FIGURE 1. A cover plate 38 is provided in the upper case section 32 which can be removed to provide ready access to the chamber 40 provided within the case sections 32, 34 of the handle means 12.

The control means 26 is provided with a transverse axial guide shaft 42 having its ends supported within wells 44 provided by the upper and lower case sections 32, 34. First and second sleeve members 46, 48 are rotatably received about the shaft 42. The outer end 50 of the sleeve section 46 is secured with the actuating wheel 28 which has portions 52, 54 extending above and below the upper and lower case sections 32, 34 respectively (FIGURE 2). Rotation of the wheel 28, thus, causes the sleeve section 48 to rotate about the axial shaft 42. The inner end 56 of the sleeve section 48 has secured with it a cam wheel 58 having sloping side portions 60, 62 providing a narrow end portion 64 and a widened end portion 66.

The conducting elements 16, 18 are pivoted about the pins 70, 72 within the front portion 21 of the handle means 12 and respectively have second ends 74, 76 which extend into the handle means 12 proximate to and contacting the tapered sides 60, 62 of cam wheel 58. A pair of spring biasing elements 78, 80 each have an end received within a respective well in the casing sections 32, 34 of the handle means 12 and its other end received over a guide pin 82 extending from a respective element 16, 18 for biasing the element ends 74, 76 towards each other and into contact with the cam wheel 58.

Thus, with the rotation of the actuating wheel 28 of the control means 26, the cam wheel 58 is caused to rotate and move the ends 74, 76 of the elements 16, 18 closer together or further apart correspondingly resulting in the pivoted opposite ends 22 moving further apart or closer together. A spring contact element 84 frictionally engages the cam wheel 58 for preventing its free rotation from the fixed position manually fixed by rotation of the actuating wheel 28. Thus, by adjusting the position of the actuating wheel 28, the ends 22 may be laterally adjustably fixed with respect to each other. The distance between the ends may be increased or decreased between outer and inner terminal positions. The enlarged diameter of the actuating wheel 28 and the camming action utilized by the control means 26, provides means for adjusting and fixing the position of the ends 22 of the conducting elements 16 and 18 with a high degree of ease and accuracy.

The sleeve section 48 is joined with the actuating wheel 30 at its outer end, while its inner end is secured with a gear wheel or pinion 68. The rotation of the wheel 30, thus, results in rotation of the pinion 68.

The control means 26 includes a gear rack 86 mounted in the lower case section 34 of the handle means 12 for slidable movement in the longitudinal axis direction. The gear rack 86, which also extends in a longitudinal direction, is engaged by the teeth of the gear wheel or pinion 68 for being actuated and positioned by rotation of the actuating wheel 30. The end 88 of the center conducting element 20 received within the handle means 12 is connected by a side extending portion 90 to the forward end of the rack 86 for actuation in the longitudinal direction. Thus, the rotation of the wheel 30 in a clockwise direction advances the rack in the direction towards the front end 21 of the handle means 12, resulting in the movement of the element 20 in the extending direction along the longitudinal axis 14, whereas rotation of the wheel 30 in the counterclockwise direction results in the opposite movement or retraction of the element 20 towards its position shown at 20′ in FIGURES 1 and 2. Rotation of the actuating wheel 30, thus, allows the adjustable fixing of the position of the contact end 24 of the element 20 with respect to the contact ends 22 of the elements 16 and 18 for providing linear and non-linear arrangements of the contact ends 22, 24 for concurrently electrically engaging terminals or desired regions of elements or circuits to be tested. The wheel 30 and actuating mechanism of the control means 26 provides for smooth actuation of the element 20 by the operator so that its position may be accurately and easily adjusted by the operator with a maximum of efficiency.

An electrical cable 92 is received through an opening 94 in the rear portion 96 of the handle means 12 for providing electrical conections with the elements 16, 18 and 20 and an electrical switch unit 96, which is supported within the cavity 40 of the handle means 12.

The switch 96 is provided with an actuating button 98 which has an end 110 extending through the upper case section 32 of the handle means 12 and an end 112 extending through the lower case section 34 for manual actuation by the operator after the contact ends 22, 24 of the elements 16, 18 and 20 have been positioned for making contact with an element or circuit to be tested.

The manual switch 96 may be actuated by depressing either the end 110 or 112. The button 92 comprises a rod which has a center cam section 114 comprising a pair of right conical sections providing a central depressed region against which the actuating lever 116 of the switch 96 bears. The cam section 114 is centrally positioned by springs 118, 120. When the button 98 is depressed at either end 110, 112, the actuating lever 116 rides up the inclined surface of the cam section 14, depressing same and actuating the switch 96.

The actuation of the button 98 can provide electrical connections with the apparatus with which the probe means 10 is connected by the electrical cable 92 and also may serve to initiate a testing operation.

The ends 74, 76 of the elements 16, 18 are each provided with a terminal which is respectively electrically connected by wires 100, 102 of the cable 92, while the rear end of the rack 86 which is made of a conducting material is provided with a terminal connected with the wire 104 of the cable 92 for providing electrical connection through the rack 86 to the electrical contact tip 24 of the element 20. The wires 106, 108 of the cable 92 are connected to respective terminals of the electrical switch unit 96.

The probe means 10 described comprises a device which may easily be operated by the use of one hand and provides control means which operates efficiently and smoothly to accurately position the contact ends of the elements for making concurrent connections with terminals of transistors of other devices and circuits which may be spaced or arranged in different and varying configurations. The manual actuating switch 96 may readily be activated by the operator for initiating a test operation once the probe means 10 has been positioned in contact with the desired means to be tested. The probe means, in addition to being easily operated and manipulated, is rugged in construction, requires a minimum of repair and maintenance and may be efficiently and inexpensively manufactured.

While the invention has been described and illustrated with reference to a specific embodiment, it is to be understood that the invention is capable of various modifications and applications, without departing essentially from the spirit thereof, which will become apparent to those skilled in the art.

What is claimed is:

1. An electrical probe means comprising a handle means extending along a longitudinal axis, first, second and third longitudinally extending conducting elements mounted in said handle means and each having a contact end, and control means rotatably supported by said handle means engaging at least one of said first and second elements for adjustably positioning and fixing the lateral distance and spacing between the ends of said first and second elements at any selected position between first and second lateral terminal positions, and engaging said third element for longitudinally extending the end of said third element with respect to said handle between first and second longitudinal terminal positions for adjustably positioning and spacing its end independently with respect to the ends of said first and second elements at any selected position between said first and second longitudinal terminal positions.

2. The means of claim 1 in which said conducting elements are supported by said handle means in side by side relationship to each other.

3. The means of claim 1 in which said control means includes cam means engaging at least one of said elements for controllably moving the contact end of at least one of said elements between first and second terminal positions and adjustably fixing and maintaining the position and spacing of the contact end of one with respect to the contact end of another of said elements for electrically engaging correspondingly spaced contacts on an electrical circuit.

4. The means of claim 1 in which said first conducting element has said contact end and a second end and is pivotally supported between its said ends with said handle means.

5. The means of claim 4 in which said control means includes a cam means rotatably supported by said handle means and engaging the second end of said first element for controllably moving its contact end between said first and second lateral terminal positions and adjustably fixing the distance between the contact ends of said elements for electrically engaging correspondingly spaced contacts of an external circuit.

6. The means of claim 1 in which said first and second conducting elements each have said contact end and a second end and are each pivotally supported between their respective ends with said handle means in side by side relationship to each other, and said control means includes cam means rotatably supported by said handle means and engaging the second ends of said first and second elements for controllably moving their contact ends between said first and second lateral terminal positions and adjustably fixing the distance between the second ends of said elements and correspondingly adjustably fixing the distance between the contact ends of said elements for electrically engaging correspondingly spaced contacts of an external circuit.

7. The means of claim 1 in which said control means includes a rack engaging at least one of said elements and a gear wheel engaging said rack means and rotatable for extending the end and adjustably fixing the position and spacing of the contact end of one of said elements with respect to the contact end of another of said elements at a selected position between said first and second longitudinal terminal positions for electrically engaging correspondingly spaced contacts of an external circuit.

8. The means of claim 7 in which said third element has said contact end and a second end, said control means includes a rack engaging the second end of said third element and a gear wheel engaging said rack and rotatably supported by said handle means for extending the second end and adjustably fixing the position and spacing of the contact end of said third element with respect to the contact ends of said first and second elements at a selected position between said first and second longitudinal terminal positions.

9. A probe means comprising a handle means, first, second and third conducting elements each having a contact end extending from said handle means and a second end movably mounted in said handle means, said first and second elements being pivotally supported between their respective ends with said handle means, and control means including cam means rotatably supported by said handle means and engaging the second ends of said first and second elements for adjustably fixing the distance between the second ends of said first and second elements and correspondingly adjustably fixing the distance between the contact ends of said first and second elements, said control means including a gear wheel and rack means actuating said third element for extending the contact end of said third element and adjustably fixing its position with respect to the contact ends of said first and second elements.

10. The means of claim 9 in which said control means including means biasing the second ends of said first and second elements toward each other and said cam means is positioned between the second ends of said first and second elements, and an actuating wheel connected with said cam means for rotatably positioning said cam means for adjustably fixing the relative position of the contact ends of said first and second elements with respect to each other, and said rack means is positionably adjustable by being slidably supported by said handle means and connected with the second end of said third element for extending its contact end and adjustably fixing the position of its contact end with respect to the contact ends of said first and second elements.

11. The means of claim 10 in which the gear wheel of said control means is rotatably mounted with said handle means in engagement with said rack means and is rotatable for actuating and adjustably fixing the position of said rack means, and an actuating wheel connected with said gear wheel for rotatably positioning said gear wheel for extending the contact end of said third element and adjustably fixing its position with respect to the contact ends of said first and second elements.

12. The probe means of claim 11 in which said handle means and said elements extend along a longitudinal axis and said first and second elements have pivotal connections with said handle means on opposite sides of said longitudinal axis and said third element is positioned along said axis between said first and second elements.

13. The probe means of claim 12 in which the extending contact end of each of said elements is directed perpendicular to the longitudinal extending direction of its said element, and including means for electrically connecting said first, second and third conducting elements with respective electrical conducting means, and a manual switch means carried by said handle means for initiating an operation upon the positioning and connection of said elements.

References Cited

UNITED STATES PATENTS

| 2,981,919 | 4/1961 | Lamont. | |
| 3,185,927 | 5/1965 | Margulis | 324—158 |
| 3,188,598 | 6/1965 | Pferd. | |

FOREIGN PATENTS 463,842  4/1937  Great Britain.

RUDOLPH V. ROLINEC, *Primary Examiner.*

E. L. STOLARUM, *Assistant Examiner.*

U.S. Cl. X.R.

339—74, 108